(12) United States Patent  (10) Patent No.: US 8,326,303 B2
Kumar et al.  (45) Date of Patent: Dec. 4, 2012

(54) METHOD OF DETERMINING WIRELESS HAND OFF PARAMETERS

(75) Inventors: Gopal N. Kumar, Bridgewater, NJ (US); Thierry Billon, Puteaux (FR); Victor Da Silva, Succasunna, NJ (US); Jean-Michel Pugeat, Paris (FR); Richard L. Davies, Corsham (GB); Robert A. Soni, Randolph, NJ (US); Frederick Deville, Paris (FR)

(73) Assignee: Alcatel Lucent, Paris (FR)

( * ) Notice: Subject to any disclaimer, the term of this patent is extended or adjusted under 35 U.S.C. 154(b) by 54 days.

(21) Appl. No.: 12/827,519

(22) Filed: Jun. 30, 2010

(65) Prior Publication Data

US 2011/0092210 A1 Apr. 21, 2011

Related U.S. Application Data

(60) Provisional application No. 61/270,537, filed on Jul. 9, 2009.

(51) Int. Cl.
*H04W 36/00* (2009.01)
(52) U.S. Cl. ........ 455/436; 455/437; 455/438; 455/440; 455/441
(58) Field of Classification Search .................. 455/436, 455/437, 438, 440, 441
See application file for complete search history.

(56) References Cited

U.S. PATENT DOCUMENTS

| 6,259,918 | B1 * | 7/2001 | Labonte et al. ............... 455/437 |
| 2004/0058678 | A1 * | 3/2004 | deTorbal ....................... 455/437 |
| 2008/0220784 | A1 * | 9/2008 | Somasundaram et al. .... 455/437 |
| 2010/0069070 | A1 * | 3/2010 | Shi et al. ...................... 455/436 |

FOREIGN PATENT DOCUMENTS

WO WO 2009/058069 A1 7/2009

OTHER PUBLICATIONS

International Search Report PCT/US2010/041449 dated Nov. 15, 2010.
Written Opinion dated Nov. 15, 2010.
Ulrich Barth: "Self-X RAN Autonomous self Organizing Radio Access Networks" Jun. 25, 2009, pp. 1-36 7th International Symposium on Modeling and Optimization in Mobile, Ad Hoc, and Wireless Networks Retrieved from the internet: URL:http://www.wiopt.org/pdf/WiOpt09_Keynote_Speech3.pdf retrieved on Oct. 5, 2010 slides 22 to 26 XP-002603562.

(Continued)

*Primary Examiner* — Barry Taylor
(74) *Attorney, Agent, or Firm* — Williams, Morgan & Amerson

(57) ABSTRACT

The present invention provides a method of determining handoff parameters. One embodiment of the method includes determining values of a hysteresis for a handoff from a serving cell, one or more pairwise offset values for hand off between the serving cell and one or more neighbor cells, and one or more times-to-trigger (TTTs) for hand off between the serving cell and the neighbor cell(s). The values may be determined so that hand off is triggered beyond a first distance from the serving cell selected to avoid ping-ponging and within a second distance from the serving cell selected so that a mobile unit moving at a selected velocity does not travel beyond a third distance within the TTT.

14 Claims, 4 Drawing Sheets

OTHER PUBLICATIONS

3GPP: "3rd Generation Partnership Project; Technical Specification Group Services and System Aspects; Telecommunications Management; Self-Optimization OAM; Concepts and Requirements (Release 9)" 3rd Generation Partnership Project Technical Specification (TS), Jun. 6, 2009 pp. 1-25 Section 6.1.3 XP-002557665.

3GPP: "3rd Generation Partnership Project; Technical Specification Group Radio Access Network; Evolved Universal Terrestrial Radio Access Network (E-UTRAN); self-configuring and self-optimizing network use cases and solutions (Release 9)" 3GPP TR 36.902 V1.2.0 (May 2009) Jun. 6, 2009, pp. 1-23 Section 4.5 XP-002557666.

Nokia Siemens Networks: "Discussion on the focus of the Mobility Robustness Optimization" 3GPP Draft: R3-090886 Son_Mobility Robustness, 3GPP: 3rd Generation Partnership Project; Mobile Competence Centre; 650, Route Des Lucioles; F-06921 Sophia-Antipolis Cedex; France, Seoul, Korea; 20090318, Mar. 18, 2009, XP050341255, Section 3.

* cited by examiner

METHOD OF DETERMINING WIRELESS HAND OFF PARAMETERS

CROSS-REFERENCE TO RELATED APPLICATIONS

This application claims the benefit of the filing date of U.S. Provisional Application Ser. No. 61/270,537 filed Jul. 9, 2009, entitled "Method for Determining Wireless Hand Off Parameters".

BACKGROUND OF THE INVENTION

1. Field of the Invention

This invention relates generally to communication systems, and, more particularly, to wireless communication systems.

2. Description of the Related Art

Wireless communication systems typically deploy numerous base stations (or other types of wireless access points) for providing wireless connectivity to mobile units (or other types of user equipment). Each base station is responsible for providing wireless connectivity to the mobile units located in a particular cell or sector served by the base station. The mobile units are handed off from one base station to another as the mobile units roam throughout the wireless communication system. From the point of view of the user, robust handover techniques are critical for supporting seamless service as the mobile unit moves around. For example, users quickly become frustrated by gaps or silences in voice communication that may be caused by latency in the handover process. For another example, users would likely switch providers if calls were frequently dropped when the user roams from one cell to another.

The basic condition for initiating a handover is that the signal strength from the candidate target base station or cell is stronger/better than the signal strength from the current serving base station or cell. However, simply handing off a mobile unit as soon as the target base station appears to have a stronger signal than the serving base station can lead to a number of problems. For example, the signal strengths near the boundaries between a serving cell and its neighbor cells are (almost by definition) nearly equal. The signal strength received by each mobile unit near a boundary is therefore approximately equal and relatively small deviations can cause the relative signal strengths to flip-flop. The strength of the signals received by a particular mobile unit may also vary rapidly due to movement of the mobile unit and/or environmental changes. Consequently, the mobile unit may be rapidly handed back and forth (a phenomenon known as ping-ponging) if the hand off is performed based only on the relative signal strength. Ping-ponging consumes valuable overhead unnecessarily, degrades the perceived call quality, and can even lead to dropped calls.

Handovers can be made more robust by using a more sophisticated handoff condition. For example, conventional handovers are performed when the signal strength from the candidate cell is better than the signal strengths from the current serving cell by a certain amount determined by a hysteresis value and offset values. Each cell uses a single value of the hysteresis, e.g., 2 dB. Each cell also maintains different values for the offset that are applied to handoffs between the cell and its neighbor cells. For example, the offset value for handoffs between a serving cell and a first neighbor cell may be 1 dB and the offset value for handoffs between the serving cell and a second neighbor cell may be 2 dB. A time-to-trigger (TTT) is used to delay the hand off until the "better" conditions on the target cell persist for at least the TTT duration. In 3G technologies, the hysteresis, offset values, and, TTT are set to one golden set that is applied to all cells. The golden set is selected for convenience alone and does not provide performance benefits.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for determining handoff parameters. One embodiment of the method includes determining values of a hysteresis for a handoff from a serving cell, one or more pairwise offset values for hand off between the serving cell and one or more neighbor cells, and one or more times-to-trigger (TTTs) for hand off between the serving cell and the neighbor cell(s). The values may be determined so that hand off is triggered beyond a first distance from the serving cell selected to avoid ping-ponging and within a second distance from the serving cell selected so that a mobile unit moving at a selected velocity does not travel beyond a third distance within the TTT.

In another embodiment, a method is provided for determining handoff parameters. One embodiment of the method includes determining values of a hysteresis for a handoff from a serving cell, one or more pairwise offset values for hand off between the serving cell and one or more neighbor cells, and one or more times-to-trigger (TTTs) for hand off between the serving cell and the neighbor cell(s). The handoff parameters may be determined so that the hysteresis, the pairwise offset value(s), and the TTT(s) are within a well of convergence of a global solution for the hysteresis, the pairwise offset value(s), and the TTTs.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
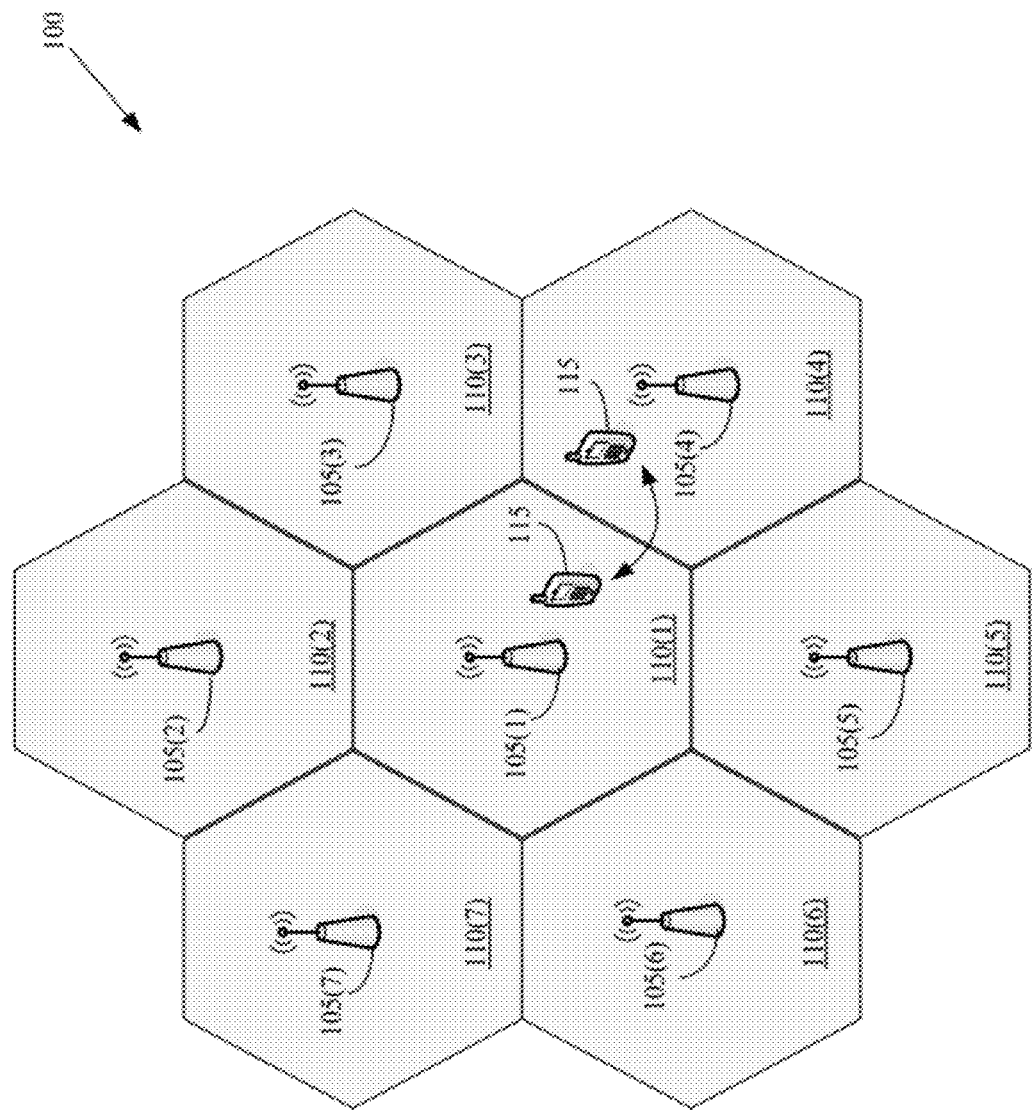
FIG. 1 conceptually illustrates a first exemplary embodiment of a communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a communication system 100. In the illustrated embodiment, the communication system 100 is an evolved packet-switched network such as the Long Term Evolution (LTE) network being developed in accordance with 3GPP standards and/or protocols. The system 100 includes access networks 105 for providing wireless connectivity to corresponding sectors or cells 110. The access networks 105 depicted in FIG. 1 are evolved UMTS terrestrial radio access network (E-UTRAN) that operate according to the 3GPP standards and/or protocols defined for the LTE upgrade path for mobile networks. However, persons of ordinary skill in the art having benefit of the present disclosure should appreciate that other types of access networks, base stations, base station routers, access points, and the like may be used to provide wireless connectivity to alternative embodiments of the system 100 that may operate according to different standards and/or protocols.

In the illustrated embodiment, the cells 110 are depicted as perfect hexagons with well-defined boundaries. However, persons of ordinary skill in the art having benefit of the present disclosure should appreciate that in actual deployments the boundaries of the cells 110 may be determined by a reference signal received power (RSRP) for a signal such as a pilot signal transmitted by the corresponding access network 105. Consequently, the cells 110 may have irregular and/or time varying shapes or boundaries. Variations in the boundaries may be the result of changing transmission parameters used by the access networks 105, environmental changes that affect the propagation and/or fading of the reference signals, and the like. Furthermore, each access network 105 may use multiple antennas or arrays of antennas to provide wireless connectivity substantially independently to sectors (not shown in FIG. 1) of the cells 110.

One or more mobile units 115 can access the wireless communication system 100 by establishing wireless connections with the access networks 105. The mobile units 115 can also roam between the cells 110 and so the wireless communication system 100 supports handoff of the mobile units 115 between different access networks 105. For example, the mobile unit 115 may roam from the cell 110(1) to the cell 110(4). The mobile unit 115 may therefore be handed off from the access network 105(1) to the access network 105(4). Techniques for performing hard handovers, soft handovers, and/or softer handovers are known in the art and in the interest of clarity only those aspects of performing handovers that are relevant to the claimed subject matter will be discussed herein.

In the illustrated embodiment, the wireless communication system 100 is a self-organizing network that provides a framework to optimize the handoff parameters on a per-cell basis. For example, instead of using a golden rule to determine the hysteresis, pairwise offset values, and time-to-trigger (TTT) for handoffs between the cells 110, the system 100 may define the parameters dynamically for each cell 110 and/or access network 105. The wireless communication system 100 may therefore implement a robust optimization algorithm that uses measurements of air interface parameters performed by the mobile units 115 and/or key performance indicators (KPI) defined by 3GPP to refine and further optimize the hysteresis, offset values, and/or TTTs. However, the optimization problem may not necessarily converge to a good or optimal solution for every set of initial conditions. To the contrary, randomly or arbitrarily selected values for the hysteresis, offset values, and/or TTT almost certainly fall outside of the well of convergence that surrounds global optimum solutions.

The techniques described herein may therefore be used to define an initial solution for the hysteresis, offset values, and/or TTT on a per-cell basis. The inventors have demonstrated that embodiments of the solution described herein lie within the well of convergence for the global optimal solution for the hysteresis, offset values, and TTT. Embodiments of this initial solution can therefore be refined based on real-time information from the network 100 and/or the mobile units 115 to converge on the global optimal solution. Embodiments of the techniques described herein may therefore be used to implement an automatic self optimizing strategy that can provide an initial good solution based on the geometry (location, orientation and antenna tilt information of sites) and RF propagation captured as maximum allowed path loss. In one embodiment, the location can be given in terms of a latitude/longitude and the orientation can be given in terms of an azimuth. The parameters of the initial solution can be determined by the wireless communication system 100 at a central entity such as a radio network controller or in the access networks 105. For example, the distributed wireless communication system 100 that implements base station routers 105, determination of the parameters can also be distributed to the base station routers 105.

Figure 2:
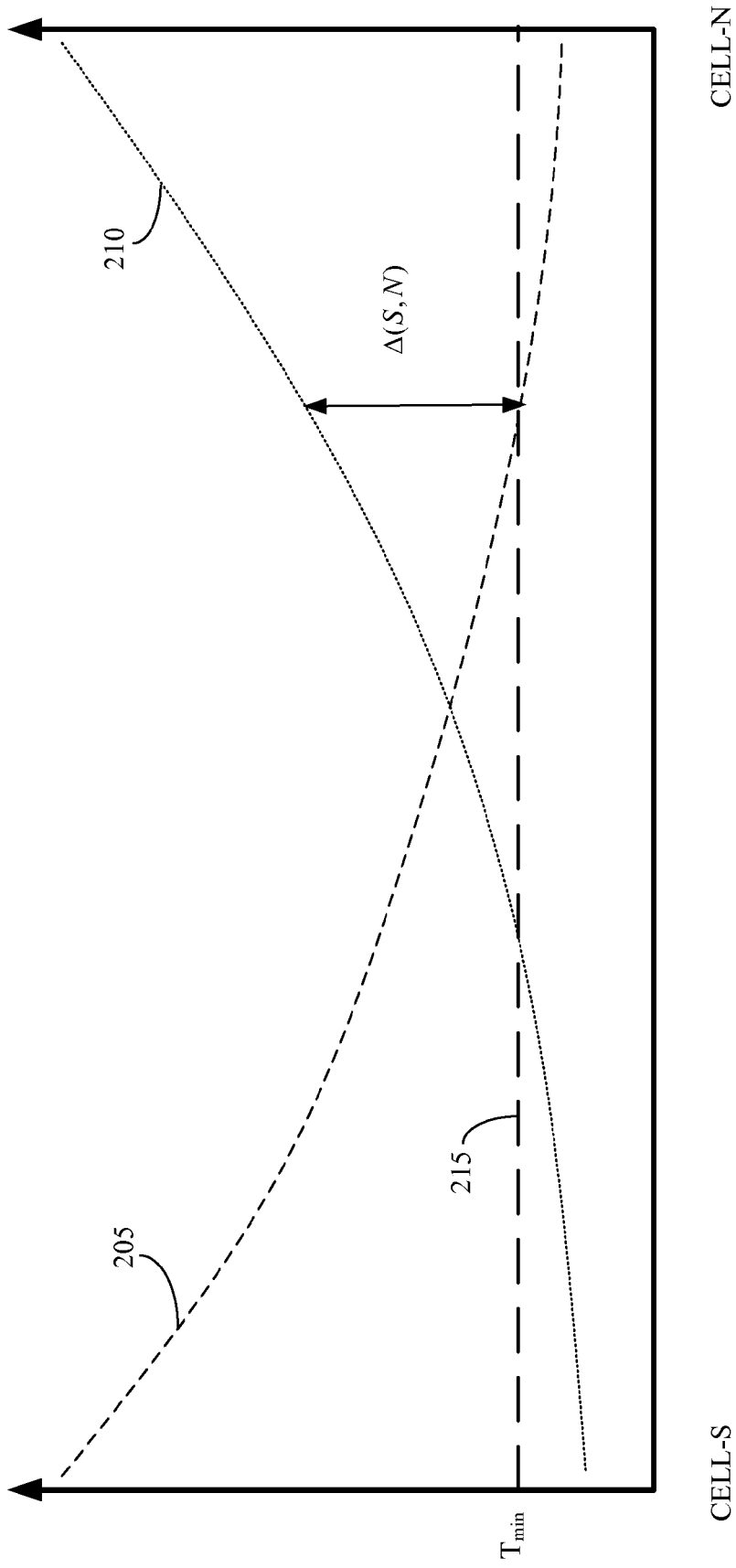
FIG. 2 conceptually illustrates a first exemplary embodiment of a geometric approach to determining handoff parameters on a per-cell basis.

FIG. 2 conceptually illustrates a first exemplary embodiment of a geometric approach to determining handoff parameters on a per-cell basis. In the illustrated embodiment, location of a serving cell (cell-s) and a neighbor cell (cell-n) are depicted along the horizontal axis. The units of the distance separating the two cells are arbitrary. The vertical axis indicates a measure of the signal strength received by a mobile unit, such as a reference signal received power (RSRP). The units of the received signal strength along the vertical axis are arbitrary. The received signal strength for a reference signal transmitted by the serving cell is indicated by the curve 205 and the received signal strength for a reference signal transmitted by the neighbor cell is indicated by the curve 210. In one embodiment, the curves 205, 210 can be determined using a known or estimated morphology of the cell deployment and the environment near the cells. For example, a path loss model can be used to determine the propagation loss and/or fading coefficients based on parameters determined from the known morphology such as cell locations, antenna orientations, antenna tilts, the RF propagation captured as a maximum allowed path loss, and the like. However, persons of ordinary skill in the art having benefit of the present disclosure should appreciate that other techniques for determining the curves 205, 210 may be used in alternative embodiments.

In order to maintain a healthy call, mobile units expect signals at a minimum received signal strength level of $T_{min}$. The quality of the user experience may be degraded (and the call may be dropped) when the received signal strength level drops below $T_{min}$. A mobile unit that is initially using the serving cell can therefore maintain a healthy call until the mobile unit travels far enough from the serving cell that the reference signal received power indicated by the curve 205 falls below the minimum received signal strength level indicated by the dashed line 215. At that point, the difference between the curves 205, 210 is given by $\Delta(s,n)$. Handoff from the serving cell to the neighbor cell is triggered when $T_n - Q_{offset}(s,n) > T_s + Q_{hyst}$, which corresponds to a signal strengths from the neighboring cell of $T_n > T_s + Q_{hyst} + Q_{offset}(s,n)$. In this equation, $T_n$ and $T_s$ are values of the reference signal received power from the serving cell and the neighboring cell, respectively, as they are measured by the mobile unit. However, handoff may be disrupted and the call potentially dropped before, during, or after the hand off if the handoff parameters are not correctly determined. For example, if the parameters are set so that $Q_{hyst} + Q_{offset}(s,n) > \Delta(s,n)$ handoff of the mobile units will not be triggered until the mobile unit has moved into a region where the reference signal received from the serving cell is too weak to support a healthy call. The parameters should therefore be set so that $Q_{hyst} + Q_{offset}(s,n) \leq \Delta(s,n)$.

One embodiment of an analytical solution for the handoff parameters can be defined as:

$$\Delta_{min} = \min_{n \in NL(s)} (\Delta(s, n))$$

$$n^* = \underset{n \in NL(s)}{\operatorname{argmin}}(\Delta(s, n))$$

$$Q_{hyst} = \Delta_{min}$$

$$Q_{offset}(s, n) = \Delta(s, n) - Q_{hyst}$$

In this solution, the minimum value is taken over all cells that are neighbors of the serving cell. This solution satisfies the requirement that $Q_{hyst} + Q_{offset}(s,n) \leq \Delta(s,n)$ for all of the neighbor cells. However, persons of ordinary skill in the art having benefit of the present disclosure should appreciate that this analytical solution is illustrative and that other solutions that satisfy the requirement that $Q_{hyst} + Q_{offset}(s,n) \leq \Delta(s,n)$ for the neighbor cells may be used in alternative embodiments.

The TTT is the time that the condition $T_n > T_s + Q_{hyst} + Q_{offset}(s,n)$ should hold true before the mobile unit is handed off from the serving cell to the neighbor cell. In one embodiment a single TTT may be selected for all the cells in a communication system. Alternatively, pairwise TTTs can be defined for different pairs of serving cells and neighbor cells. The RSRP for the serving cell measured at the mobile unit should remain at an acceptable value ($T_s > T_{min}$) for the duration of the TTT so that the mobile unit can maintain a healthy call with the serving cell throughout the handoff process. Increasing the TTT can reduce the frequency of handoffs between the serving and the neighbor cells. However, increasing the TTT also increases the probability that a mobile unit may travel into a region where the RSRP becomes unacceptably small ($T_s < T_{min}$), which may result in degraded service and/or a dropped call. Determining the hysteresis, the offsets, and the TTT therefore requires a mutual trade-off because one cannot have arbitrarily high values for all of these parameters.

The values of the RSRPs that are used to determine whether to hand off the mobile unit from the serving cell to the neighbor cell are filtered values of measurements taken over a time interval. In one embodiment, the filtered value of the RSRP is determined by a parameter κ in the following filter function that determines recursive updates to the filtered values:

$$T(i) = \left(1 - \left(\frac{1}{2}\right)^{\frac{K}{4}}\right)T(i-1) + \left(\frac{1}{2}\right)^{\frac{K}{4}}V(i)$$

In this formula, T(i) and T(i−1) are the filtered values at the current instance or time interval (i) at the previous instant or time interval (i−1), respectively, and V(i) represents the measured value at the instant or time interval (i). The filtering coefficient determines the weighted contribution of the latest value to the recursive filter output. For this particular filtering algorithm, approximately $$2^{\frac{K}{4}}$$

reporting periods may be needed to identify changes in the received signal strengths that may lead to a handoff condition. In one embodiment, L1 layer functionality sends measurements (which may also be additionally filtered at the L1 layer) to the L3 layer once every transmission time interval, which may be approximately 1 ms in some embodiments. The length of the reporting interval in this case is one transmission time interval (TTI).

Figure 3:
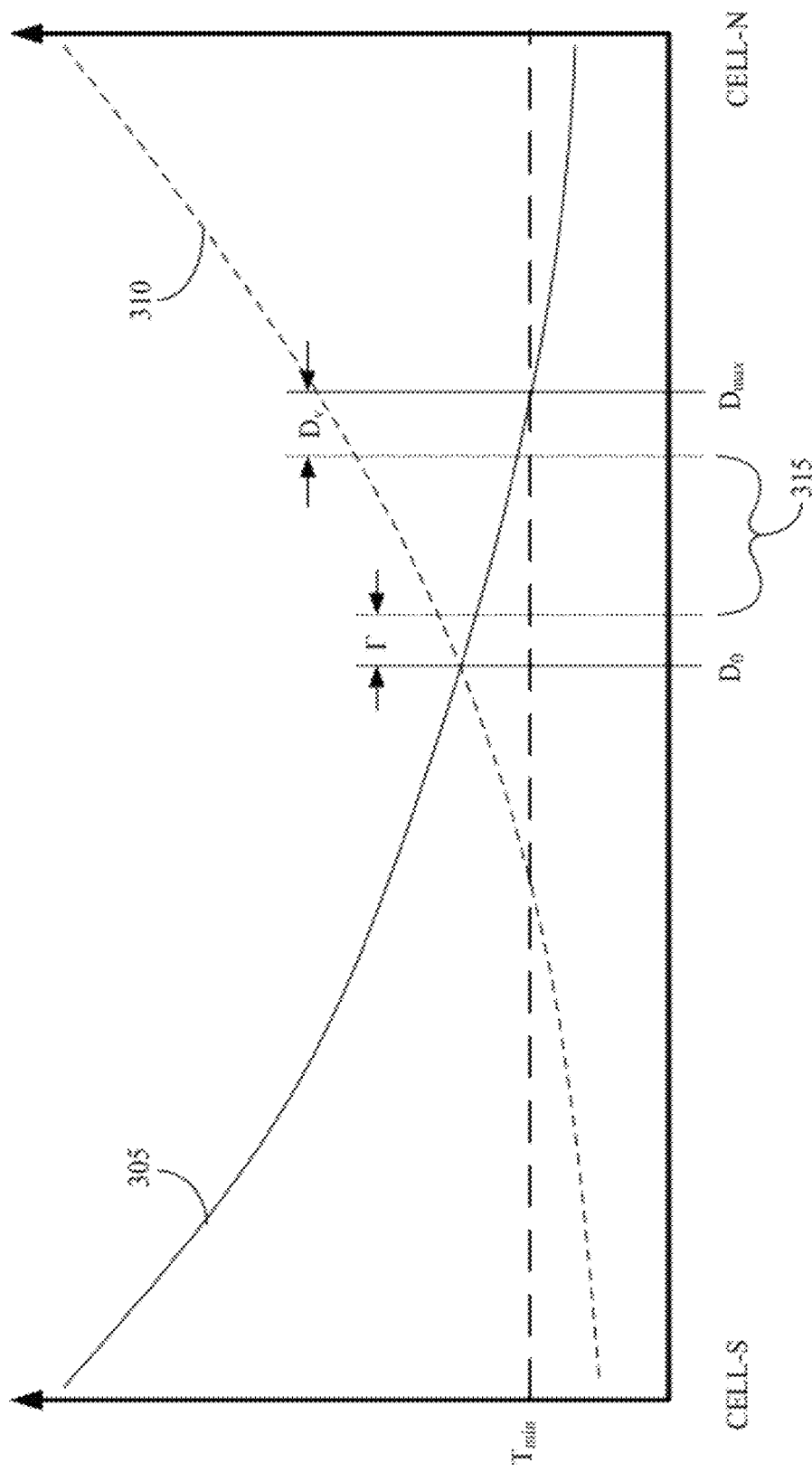
FIG. 3 conceptually illustrates a second exemplary embodiment of a geometric approach to determining handoff parameters on a per-cell basis.

FIG. 3 conceptually illustrates a second exemplary embodiment of a geometric approach to determining handoff parameters on a per-cell basis. In the illustrated embodiment, location of a serving cell (cell-s) and a neighbor cell (cell-n) are depicted along the horizontal axis. The units of the distance separating the two cells are arbitrary. The vertical axis indicates a measure of the signal strength received by a mobile unit, such as a reference signal received power (RSRP). The units of the received signal strength along the vertical axis are arbitrary. The received signal strength for signals transmitted by the serving cell is indicated by the curve 305 and the received signal strength for signals transmitted by the neighbor cell is indicated by the curve 310. In one embodiment, the curves 305, 310 can be determined using a known or estimated morphology of the cell deployment and the environment near the cells.

In the illustrated embodiment, the RSRPs for the serving and neighbor cells are approximately equal at the distance $D_0$.

The critical distance or maximum distance from the serving cell $D_{max}$ is defined as the distance at which $T_s = T_{min}$. Handoff of the mobile unit should be triggered subject to certain conditions. First, ping-ponging of the mobile unit between the two cells can be reduced or avoided by appropriately selecting the handoff parameters. For example, ping-ponging can be avoided or reduced to an acceptable level by setting $Q_{hyst} + Q_{offset}(s,n) > 2$ dB. This criterion implies that the distance at the handoff margin ($D_{hom}$) should satisfy the condition:

$$D_{hom} - D_0 > \Gamma$$

The distance offset used to prevent or reduce ping-ponging is given by $\Gamma$ in the above formula. Second, a mobile unit moving at a velocity (v) should not be able to travel beyond $D_{max}$ before the handoff condition can be detected and the TTT and processing time required to make the handoff can elapse. The maximum distance ($D_v$) that the mobile unit may be able to travel along a line between the neighboring and serving cells is given by:

$$D_v = v(TTT + 2^{\frac{K}{4}}\tau + \delta) \leq D_{crit} - D_{hom}$$

In the above formula, the reporting interval used in the filtering process is indicated by $\tau$ and the internal processing delay is indicated by $\delta$. For example, following a change in the actual radio propagation conditions, the mobile unit may first detect this change after a delay of approximately $\tau$ due to the filtering process. The mobile unit can then start counting down the TTT and if the condition persists for this interval a handoff can be triggered. The actual handoff can be performed after a processing delay of $\delta$. This condition is represented geometrically in FIG. 3.

In one embodiment, a maximum value of $TTT_{max}$ can be set by the condition that the maximum distance ($D_v$) is equal to the distance used to reduce or avoid ping-ponging. This condition for the distance at the handoff margin ($D_{hom}$) is:

$$D_{hom} = D_0 + \Gamma$$

Inserting this condition into the travel time criterion:

$$D_v = v(TTT + 2^{\frac{K}{4}}\tau + \delta) \leq D_{crit} - D_0 - \Gamma$$

gives the following expression for $TTT_{max}$:

$$v\left(TTT_{max} + 2^{\frac{K}{4}}\tau + \delta\right) = D_{crit} - \frac{D}{2} + \Gamma.$$

This expression can then be written as:

$$TTT_{max} = \frac{D_{crit} - \frac{D}{2} + \Gamma}{v} - 2^{\frac{K}{4}}\tau$$

In one embodiment, the initial value of TTT maybe set equal to $TTT_{max}$. However, the ping-ponging criterion and the travel time criterion typically define a range 315 of acceptable values for the distance at the handoff margin ($D_{hom}$). Thus, in other embodiments, other values of the hysteresis, pairwise offset, and TTT that fall within this range of acceptable values can be used to generate the initial solution. For example, the distance at the handoff margin ($D_{hom}$) may be set to be midway between the boundaries determined by the ping-ponging criterion and the travel time criterion.

Figure 4:
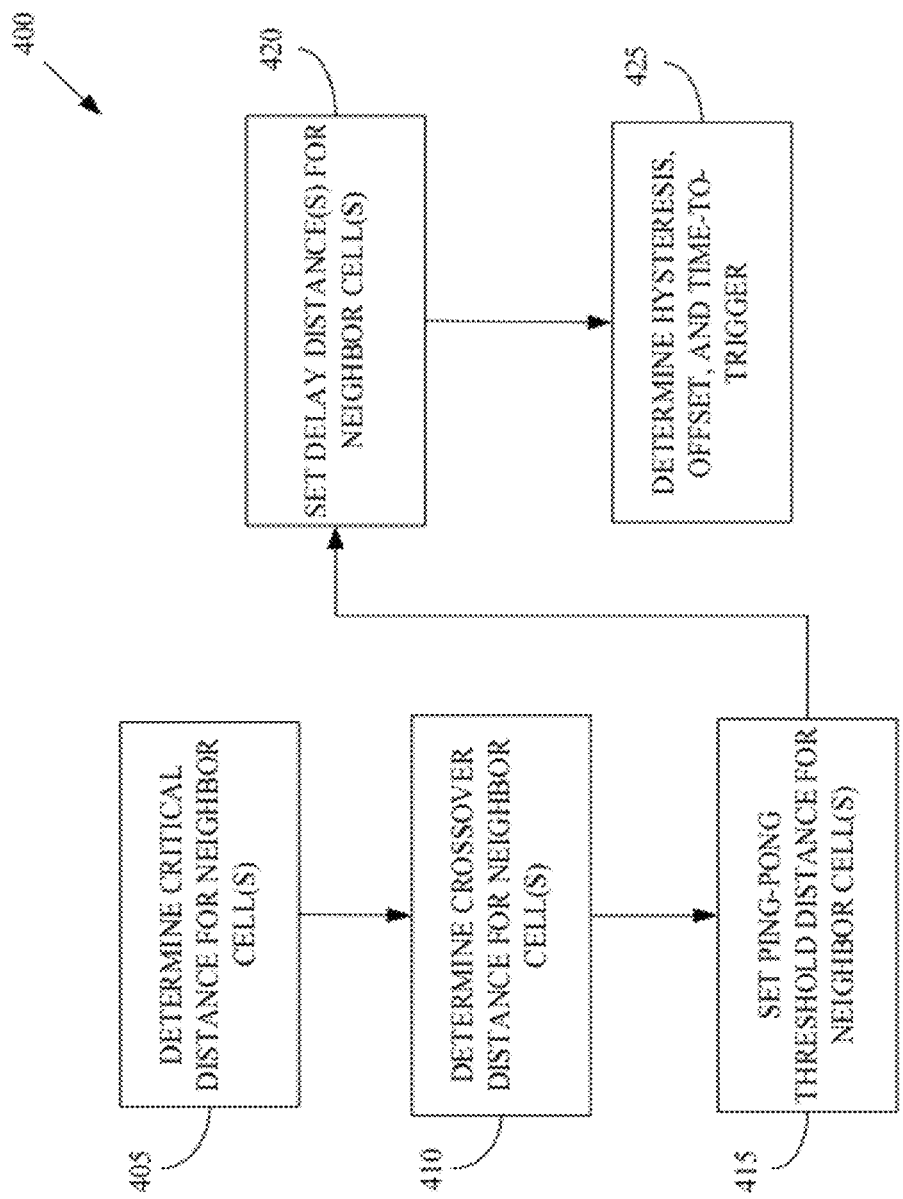
FIG. 4 conceptually illustrates one exemplary embodiment of a method of determining handoff parameters.

FIG. 4 conceptually illustrates one exemplary embodiment of a method 400 of determining handoff parameters. In the illustrated embodiment, a critical distance is determined (at 405) for one or more neighbor cells of a serving cell. The critical distance can be defined as the distance at which the reference signal received power falls below a level sufficient to maintain a healthy call connection to a mobile unit that is at a location separated from the serving access network by the critical distance. A crossover distance can also be determined (at 410) for each of the neighbor cells. The crossover distance may be defined as the distance at which the reference signal received power from the serving cell becomes equal to the reference signal received power from the corresponding neighbor cell.

The constraints on the handover margin can then be applied to identify a handoff criterion or margin. In the illustrated embodiment, a ping-pong threshold distance is set (at 415) relative to the crossover distance and represents a distance that is sufficiently large to reduce or avoid ping-ponging of a mobile unit. Persons of ordinary skill in the art having benefit of the present disclosure should appreciate that the difference between ping-ponging and handing off may be a matter of degree and so the value of the ping-pong threshold distance may depend on the particular context and/or deployment scenario. Delay distances can also be set (at 420) for each of the neighbor cells. In one embodiment, the delay distances may be set (at 420) relative to the critical distance so that a mobile unit moving at a particular velocity (or velocities) does not travel the delay distance and move beyond the critical distance before a detected handoff can be completed.

The hysteresis, pairwise offset values, and TTT(s) can be determined (at 425) based on the critical distance(s), the crossover distance(s), the ping-pong threshold distance(s), and/or the delay distance(s) defined for the serving cell and the neighbor cell(s). As discussed herein, the handoff parameters can be determined (at 425) so that hand off is triggered beyond a first distance from the serving cell selected to avoid ping-ponging and within a second distance from the serving cell selected so that a mobile unit moving at a selected velocity does not travel beyond a third distance within said at least one TTT. The hysteresis, pairwise offset value(s), and TTT(s) determined according to embodiments of the techniques described herein may be within a well of convergence of a global solution for the hysteresis, pairwise offset value(s), and TTT(s). These handoff parameters can then be stored in the access networks and used to define the initial parameters for a dynamic handoff parameter algorithm that may be used in a self organizing network. The handoff parameters can also be transmitted to the mobile units so that they can use these parameters to determine when to trigger handoff from one cell to another. Persons of ordinary skill in the art having benefit of the present disclosure should appreciate that the steps in the method 400 can be performed sequentially as indicated or alternatively in any other order or concurrently.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   determining values of a hysteresis for a handoff from a serving cell, at least one pairwise offset value for hand off between the serving cell and at least one neighbor cell, and at least one time-to-trigger (TTT) for hand off between the serving cell and said at least one neighbor cell so that hand off is triggered beyond a first distance from the serving cell selected to avoid ping-ponging and within a second distance from the serving cell selected so that a mobile unit moving at a selected velocity does not travel beyond a third distance within said at least one TTT,
   wherein determining said at least one pairwise offset value comprises determining a plurality of pairwise offset values so that a sum of the value of the hysteresis and each pairwise offset value for each neighbor cell is less than or equal to a difference between a reference signal received power for the serving cell at the third distance and a reference signal received power at the third distance for each neighbor cell.

2. The method of claim 1, comprising determining the third distance so that the reference signal received power from the serving cell at the third distance is a minimum value to maintain a healthy call.

3. The method of claim 2, wherein determining a value of the hysteresis comprises determining the value of the hysteresis based on a minimum value of a difference between the reference signal received power for the serving cell at the third distance and a plurality of reference signal received powers at the third distance for a plurality of neighbor cells including said at least one neighbor cell, the minimum value being determined over the plurality of neighbor cells.

4. The method of claim 3, comprising determining the reference signal received power for the serving cell and the plurality of reference signal received powers for the plurality of neighbor cells based on a path loss model using locations, azimuths, and antenna tilts of the serving cell and the neighbor cells.

5. The method of claim 1, wherein determining said at least one TTT comprises determining at least one TTT based on at least one of a filtering timescale or a processing time used by at least one mobile unit.

6. The method of claim 5, wherein determining said at least one TTT comprises determining a plurality of TTTs for a plurality of mobile units.

7. The method of claim 5, comprising at least one of storing values of the hysteresis, said at least one pairwise offset value, and said at least one TTT at the serving cell or conveying values of the hysteresis, said at least one pairwise offset value, and said at least one TTT to said at least one mobile unit.

8. A method, comprising:
   determining values of a hysteresis for a handoff from a serving cell, at least one pairwise offset value for hand off between the serving cell and at least one neighbor cell, and at least one time-to-trigger (TTT) for hand off between the serving cell and said at least one neighbor cell so that the hysteresis, said at least one pairwise offset value, and said at least one TTT are within a well of convergence of a global solution for the hysteresis, said at least one pairwise offset value, and said at least one TTT,
   wherein determining said at least one pairwise offset value comprises determining a plurality of pairwise offset values so that a sum of the value of the hysteresis and each pairwise offset value for each neighbor cell is less than or equal to a difference between a reference signal received power for the serving cell at the third distance and a reference signal received power at the third distance for each neighbor cell.

9. The method of claim 8, wherein determining the values of the hysteresis, said at least one pairwise offset value, and said at least one TTT comprises determining the values so that hand off is triggered beyond a first distance from the serving cell selected to avoid ping-ponging and within a second distance from the serving cell selected so that a mobile unit moving at a selected velocity does not travel beyond a third distance within said at least one TTT, the third distance being selected so that the reference signal received power from the serving cell at the third distance is a minimum value to maintain a healthy call.

10. The method of claim 9, wherein determining a value of the hysteresis comprises determining the value of the hysteresis based on a minimum value of a difference between the reference signal received power for the serving cell at the third distance and a plurality of reference signal received powers at the third distance for a plurality of neighbor cells including said at least one neighbor cell, the minimum value being determined over the plurality of neighbor cells.

11. The method of claim 10, comprising determining the reference signal received power for the serving cell and the plurality of reference signal received powers for the plurality of neighbor cells based on a path loss model using locations, azimuths, and antenna tilts of the serving cell and the neighbor cells.

12. The method of claim 8, wherein determining said at least one TTT comprises determining at least one TTT based on at least one of a filtering timescale or a processing time used by at least one mobile unit.

13. The method of claim 12, wherein determining said at least one TTT comprises determining a plurality of TTTs for a plurality of mobile units.

14. The method of claim 12, comprising at least one of storing values of the hysteresis, said at least one pairwise offset value, and said at least one TTT at the serving cell or conveying values of the hysteresis, said at least one pairwise offset value, and said at least one TTT to said at least one mobile unit.

* * * * *